(12) United States Patent
Pantelis

(10) Patent No.: US 11,244,394 B2
(45) Date of Patent: Feb. 8, 2022

(54) DISTRIBUTED SOFTWARE SYSTEM AND COMMUNICATIONS TERMINAL TO INCREASE SITUATIONAL AWARENESS IN DERIVATIVES TRADING

(71) Applicant: Thomas LeRoy Pantelis, Palatine, IL (US)

(72) Inventor: Thomas LeRoy Pantelis, Palatine, IL (US)

(*) Notice: Subject to any disclaimer, the term of this patent is extended or adjusted under 35 U.S.C. 154(b) by 0 days.

(21) Appl. No.: 14/448,537

(22) Filed: Jul. 31, 2014

(65) Prior Publication Data

US 2015/0046313 A1 Feb. 12, 2015

Related U.S. Application Data

(60) Provisional application No. 61/861,074, filed on Aug. 1, 2013.

(51) Int. Cl.
G06Q 40/04 (2012.01)

(52) U.S. Cl.
CPC .................. G06Q 40/04 (2013.01)

(58) Field of Classification Search
CPC ........................................ G06Q 40/04
See application file for complete search history.

(56) References Cited

U.S. PATENT DOCUMENTS

| | | | | |
|---|---|---|---|---|
| 6,173,276 B1* | 1/2001 | Kant | ...................... | G06F 17/13 706/50 |
| 6,993,504 B1* | 1/2006 | Friesen | .................. | G06Q 20/10 705/36 R |
| 7,035,170 B2* | 4/2006 | Narayanaswami | ...... | G04G 9/02 368/10 |
| 7,702,570 B2* | 4/2010 | Noviello | ................ | G06Q 40/04 705/35 |
| 7,835,972 B2* | 11/2010 | Almeida | ................ | G06Q 40/04 705/36 R |
| 8,108,299 B1* | 1/2012 | Waelbroeck | ........... | G06Q 40/04 705/37 |
| 8,228,332 B1* | 7/2012 | Perttunen | ............. | G06Q 40/025 345/440 |

(Continued)

FOREIGN PATENT DOCUMENTS

WO    WO-03026252 A2 *  3/2003  ............ H04M 3/487

OTHER PUBLICATIONS

Su Te Lei, "Visual Exploration of Financial Time Series," 2011, The University of Texas at Dallas, pp. 1-135.*

*Primary Examiner* — Kenneth Bartley
(74) *Attorney, Agent, or Firm* — Hayes Soloway P.C.

(57) ABSTRACT

A distributed software application and communications terminal are provided which allows for increased situational awareness, and faster, more informed decision making for both floor and non-floor exchange derivatives traders. The present invention gives traders an enhanced situational awareness by using dial displays and calibration capabilities. The method has several closely interrelated modes and embodiments tailored to allow traders to maintain instant-glance situational awareness of a market, or of several markets. The present invention presents an alert for a trade, or for targeting yields, via a plethora of modes and specially juxtaposed graphical layouts. Calibration and recalibration capabilities are provided to enhance real-time analysis for traders.

10 Claims, 17 Drawing Sheets

(56) References Cited

U.S. PATENT DOCUMENTS

| | | | | |
|---|---|---|---|---|
| 8,296,221 | B1* | 10/2012 | Waelbroeck | G06Q 40/04 705/37 |
| 8,301,535 | B1* | 10/2012 | Zerenner | G06Q 40/06 705/36 R |
| 8,301,537 | B1* | 10/2012 | Rachev | G06Q 40/06 705/35 |
| 8,442,844 | B1* | 5/2013 | Trandal | G06Q 30/012 705/35 |
| 8,719,139 | B1* | 5/2014 | Smyk | G06Q 40/04 705/36 R |
| 9,235,547 | B1* | 1/2016 | Hartman, II | H04L 12/5885 |
| 9,922,356 | B1* | 3/2018 | Garcia, III | G06Q 30/0609 |
| 2002/0004789 | A1* | 1/2002 | Huyler | G06Q 30/02 705/400 |
| 2002/0010667 | A1* | 1/2002 | Kant | G06F 8/10 705/35 |
| 2002/0026404 | A1* | 2/2002 | Thompson | G06Q 40/04 705/37 |
| 2003/0069821 | A1* | 4/2003 | Williams | G06Q 40/06 705/36 R |
| 2003/0088492 | A1* | 5/2003 | Damschroder | G06Q 40/00 705/36 R |
| 2004/0111357 | A1* | 6/2004 | Downs, II | G06Q 40/00 705/37 |
| 2004/0193524 | A1* | 9/2004 | Almeida | G06Q 40/06 705/36 R |
| 2005/0240501 | A1* | 10/2005 | Huang | G06Q 40/06 705/37 |
| 2006/0224489 | A1* | 10/2006 | Pantelis | G06Q 40/04 705/37 |
| 2007/0005477 | A1* | 1/2007 | McAtamney | G06Q 40/06 705/35 |
| 2007/0022054 | A1* | 1/2007 | Tumen | G06Q 20/042 705/45 |
| 2007/0035661 | A1* | 2/2007 | Resner | G06F 1/3203 348/468 |
| 2009/0254473 | A1* | 10/2009 | Waelbroeck | G06Q 40/00 705/37 |
| 2010/0293110 | A1* | 11/2010 | Rosenthal | G06Q 40/04 705/36 R |
| 2011/0058200 | A1* | 3/2011 | Miyahara | H04N 1/603 358/1.9 |
| 2011/0187710 | A1* | 8/2011 | Giovinazzi | G06T 15/00 345/419 |
| 2011/0238555 | A1* | 9/2011 | Rosenthal | G06Q 40/04 705/37 |
| 2011/0251942 | A1* | 10/2011 | Rosenthal | G06Q 40/04 705/37 |
| 2012/0260209 | A1* | 10/2012 | Stibel | G06Q 40/02 715/780 |
| 2014/0201126 | A1* | 7/2014 | Zadeh | G06K 9/627 706/52 |
| 2015/0046313 | A1* | 2/2015 | Pantelis | G06Q 40/04 705/37 |

* cited by examiner

Above dial shows yield associated with the 126 call strike.

Above dial shows yield associated with the 120.5 put strike.

| | |
|---|---|
| Underlying Unit | One 10-Year U.S. Treasury Note futures contract of a specified delivery month. |
| Tick Size (minimum fluctuation) | 1/64 of a point ($15.625/contract), rounded up to the nearest cent/contract. For cabinet transactions only, minimum tick sizes range from $1.00 to $15.00, in $1.00 increments per option contract. |
| Strike Prices | Strike prices will be listed in increments of one-half of one point. The minimum strike price range will include the at-the-money strike price closest to the current futures price plus the next fifty consecutive higher and the next fifty consecutive lower strike prices. |
| Contract Months | The first three consecutive contract months (two serial expirations and one quarterly expiration) plus the next four months in the March, June, September, and December quarterly cycle. Serials will exercise in the first nearby quarterly futures contract. Quarterlies will exercise into futures contracts of the same delivery period. |
| Last Trading Day | The last Friday which precedes by at least two business days the last business day of the month preceding the option month. Trading in expiring options ceases at the close of the regular CME Globex trading session for the corresponding futures contract. |
| Exercise | American-style. The buyer of an option may exercise the option on any business day prior to expiration by giving notice to CME Clearing by 6:00 p.m. Options that expire in-the-money after the close on the last trading day are automatically exercised, unless specific instructions are given to CME Clearing by 6:00 p.m. |
| Expiration | Unexercised options shall expire at 7:00 p.m. on the last trading day. |

FIG. 4C

Another embodiment of the invention involves indicating the implied future range of the market as a function of where the stylus is pointing and shading (light gray) probable range of market based on implied volatility.

DISTRIBUTED SOFTWARE SYSTEM AND COMMUNICATIONS TERMINAL TO INCREASE SITUATIONAL AWARENESS IN DERIVATIVES TRADING

BACKGROUND OF THE INVENTION

1. Field of the Invention

The present invention relates generally to distributed software application and interactive communications terminal for faster and more intelligent trading of public exchange derivative futures and options. More particularly, the present invention relates to a distributed software communications terminal which helps an average trader increase situational awareness and response times, by receiving (or targeting) only highly-pre-filtered pre-assembled alerts about significant trades only (as opposed to mere access to a universe of "all" trades). This enables much faster price discovery similar to the way floor market-maker filters out noise to focus only on specific significant trades knowable only by standing in between related exchange pits, and teaches trading strategies in a novel way.

Open outcry is still the best way to capture derivative market dynamics as key information is available first and foremost exchange members and employees to compute the actual levels trades are occurring at. This information is available but generally is not widely disseminated for a number of reasons—ignorance is chief among them—also outright laziness. Market makers pay good money to have the privilege to stand in the trading pits. They are keenly aware and they make their living by paying extremely close attention to the relationship between the option price and the price of the underlying security. The quality and completeness of key information that these market makers observe and act on drops sharply and therefore the intelligence can be lost—that is why they invest large sums of money in exchange membership and incredible amounts of energy in paying attention and are constantly updating their price models.

2. Prior Art

In many ways, public exchanges still use arcane systems and pricing schemes such as ¼ of $\frac{1}{32}^{nd}$ of a point instead of just decimals, used for hundreds of years in open outcry trading pits. There is a fair amount of math involved to convert 32nds, for example into proper fractions or dollar amounts so that comparisons to the cash market can be made and proper hedges can be placed. Understanding the expiration symbols and which options are exercisable against which futures can be tricky. In some of the illustrations such as FIG. 7, it can be seen that selecting a futures expiration month will provide a visual not unlike a solar system where in concentric circles provide an easy method to see how the expirations relate to the underlying future.

A. Prior Art Overview

There is a profound shift in trading action away from the major floor exchanges. More and more private individuals are now trading via a plethora of online Internet and Mobile trading systems. Instant e-mail alerts and near-real-time data feeds for consumers have helped average home traders gain insights and information which were once only accessible to floor traders. However, these still do not give anywhere near the same level of price discovery and situational awareness that a floor trader has, due to certain advantages standing in or near pits for both Futures and related Options. Market makers can see and hear complex relationships going on in one or more pits. Floor traders pay extremely high premiums for this advantage. Presently, an off floor trader would have to hire a designated clerk to record the necessary inputs and gain access to information similar to what an open outcry floor trader can view and hear in an instant.

A problem with prior art non-floor trading systems, is that they provide too much information which cannot fit in a single screen, or needs several screens. In order to determine cash yields associated with various futures and option prices. Current systems require users to look up components such as conversion factors and perform calculations in order to determine yields. Also significant trades are typically buried in the noise of many other insignificant trades, and there is no easy way to assemble all the different pieces of information related to a single significant trade, into one intuitive display, which can facilitate better situational awareness. Many Internet trading data service providers attempt to level the playing field of individual traders vs. floor traders, by offering near real-time bid/ask quotes, and Volatility Alerts. However, the way they display such alerts has typically been akin to a glorified spreadsheet with optional candlestick charts, or a screen full of many, many numbers, which many beginner traders and professionals alike might find distracting or un-intuitive, or simply "too slow" to digest all in one quick visual glance.

Prior art financial data providers typically give a rather tedious user interface, in which the users must actively filter many screens for types and dates of securities to watch, perhaps with a small corner of the screen for filtered newsfeeds or email alerts or mobile alerts. There, the user is still responsible to make intuitive sense of all that data. Information overload often hampers the trader, because he/she is forced to look at one spot on screen, while being blind to what is going on in another part of the screen or on a separate screen. It is useful to think of a pilot flying a plane—by having relevant strategically juxtaposed instruments important information such as altitude, airspeed, ground speed, etc can be known at a glance.

In addition, prior art has more-or-less static displays, which do not take adequate advantage of peripheral motion-sensing of the human eye. Humans and animals have evolved eyesight which detects movement far easier and faster than stationary objects.

B. Importance of Implied Volatility

Implied volatility reflects whether or not the market believes the historical rate is correctly predicting future events. If implied is lower than historical this would mean futures events (economic indicators, socioeconomic events and what have you) look dull. If implied is greater, then future events could be volatile.

Implied volatility is derived by taking the current prices that an options trades at in relation to the underlying futures. Market makers are constantly making bid offer prices based on where the appropriate underlying futures contract is trading—when supply and demand factors impact either the futures price or the option prices volatility will often change. By showing the component prices juxtaposed to replicate this price discovery process will reveal to users dynamically how this process works.

This is important because the exchanges do not report this information. It is there, but it is up to each floor member to decide what inputs to use when trying to figure out volatility. Thus present systems are very tedious, inaccessible to non-floor traders. Professional traders rely on various different information sources which require much manual work to coalesce and make sense of. Most of this information is culled from voice (if one is physically present on the floor) and electronically via e-mail, news services and web pages.

There is no known system, however, for culling and condensing into a single display, all the specific items of interest for significant trades, which, when juxtaposed, can help an average non-floor trader make better-informed faster decisions, similar to the way a floor trader or market maker does.

C. The Need for Faster Price-Discovery for Non-Floor Traders

Floor trading is an arcane process with a lot of idiosyncratic language symbols and hand signals. It takes a fair amount of practice and experience to make sense of all these inputs. However once understood they become invaluable tools for communicating important information to the entire community. The challenge is to create similar situational awareness to non-floor participants. Given this challenge new methods are required to render faster price analysis and response times.

Eye-to-eye contact and peripheral vision of arm/hand movements (signals) at the pit was and still is vital for price discovery, word-of-mouth alerting, with support staff on the floor to help relay signals and bid/ask spreads to the wall displays, which are visible to the pit traders, and to the world. At the exchanges, there are additional nearby large-screens for the most important movements going on at each particular pit. This kind of situational awareness is simply not present even in the best Internet and mobile financial data providers at this time.

FIG. 9A shows a traditional prior art method of displaying profit/loss curves for a 1:2 Call Ratio Spread. This method of analysis is complicated and time-consuming for both floor and non-floor traders, and does not allow much support for "instant" decisions.

No commonly-available system is known, however, for a distributed software communications terminal which allows non-floor traders to mimics the fastest price-discovery thinking processes used by floor traders.

SUMMARY OF THE INVENTION

A primary objective of the present invention is to greatly improve the situational awareness and response time for floor and non-floor traders at all levels of skill, by implementing some concepts analogous to situational awareness displays in military fighter aircraft. This prime objective is to give traders, even those not on an exchange trading floor, some sense of the signaling and peripheral vision motion cues which used to be present only on floors.

A first objective of the present invention is to provide a distributed software terminal communications application which enables non-floor traders to gain access to faster price-discovery tools, such as on-the-spot alerts of a significant trade (usually determined by a real human on the floor, optionally with assistance of a software suggestion algorithm), with pre-filtered, pre-calculated implied volatility, which mimics the kinds of focused information flow formerly available only to floor traders.

A second objective is to provide a unique plethora and arrangement of polar coordinate indicators which, together in specific juxtaposition, embody alerts for significant trades, plus a means for automated smart calibration of these indicators in a way which scales appropriately to each significant trade.

A third objective is to provide a better means for traders to target yields per each option strike price.

A fourth objective is to provide a different display mode for alerting a trader of significant trades (in the recent past), and different display mode for targeting and estimating strategies to in a much easier and more intuitive fashion than prior art.

A sixth objective is to save traders time from having to manually look up contract specs (which specify fractional trading units such as $\frac{1}{4}$ of $\frac{1}{32}^{nd}$ prices), by visually showing what units a particular instrument trades at along the rims of the polar indicator gauges themselves, and by smartly calibrating the unit ranges around the rims when the pointers reach near 180 degrees, to prevent the indicators going out of range.

A seventh objective is to allow traders to view past historic alerts by clicking on a traditional x-y trading history chart on a marked day, and timestamp, to see what volatility was doing at the time of that trade, to better understand the dynamics of the market at that time.

A eighth objective is to reduce the intimidation factor in which arcane trading practices (such as use of fraction-of-a-fraction $\frac{1}{4}$ of $\frac{1}{32}^{nd}$ prices) are presented in a more automated fashion, so that average traders do not need to do so much math in the head, and can just see instantly if, for example, implied volatility goes up or down when an Option moves significantly, but the underlying Future remains the same.

A ninth objective is to allow traders a faster view of option spread strategies than the traditional X-Y profit-loss curves.

It is also an objective to do so inexpensively, without requiring steep floor membership fees.

Another objective is to make this distributed system available on networked computers, PDA's, mobile devices such as smartphones and notepads.

A further object is to provide a unified user interface which teaches trading strategies the way floor market makers think of trading, as opposed to prior art systems targeted at off floor traders.

The first primary objective can be accomplished by arranging a small plurality of (at least three) juxtaposed polar coordinate circular or oval gauges, such as one for an underlying Future, and another for its related Option, and another for the Implied Volatility. The present invention shows unique embodiments as side-by-side FIG. 1, FIGS. 2A-2D, FIG. 5 or concentric gauges FIGS. 6A-6B. This juxtaposed arrangement mimics on a single "silent" 2D visual screen what an astute floor trader looks for amidst a cacophony of sights and sounds, standing in proximity to a noisy Futures pit and an Options pit. A truly gifted floor trader is able to pick out (filter out) only significant trades by listening carefully for open outcries, and doing quick math in his/her head for estimating Implied Volatilities.

In the present invention, the polar coordinate shape and form of these gauges, in conjunction with their juxtaposition FIG. 1, allows average non-floor traders to effectively "see" vital implied volatility movements visually, instantly, akin to what an astute floor trader might do quickly on a noisy trading floor.

The present invention will do this, when the publisher inputs the correct data from floor sources, namely the option that traded and its price, the futures contract to which it is related and the associated prices at the correct time. The present invention is unique in that large amounts of data can be viewed instantly in a greatly simplified, aesthetically pleasing and faster-to-digest visual form.

For instance, a floor trader is in the thick of an exchange with many things happening at once—too much for home trading systems to capture on a single screen. The floor trader might see one large anomaly occurring in the Options pit at one strike price, which temporarily spikes up implied volatility (and prices) for all other related Options at different strike prices, which can give a special advantage to the floor trader if he/she also has an eye (and ear) upon what is happening simultaneously in the adjacent Futures pit. Thus, despite a wild cacophony of yelling, and a huge plethora of displays surrounding the floor trader, the astute one only is interested in a few specific actions, and will do a lot of the filtering and processing in his/her head.

The ninth objective is accomplished in the present invention by implementing a uniquely configured polar coordinate indicators instead, as preferably embodied in FIG. 9B, to show more instantly the optimal trading price ranges where profit would occur upon expiry of the spread, in relation to its underlying instrument such as a Future.

The present invention helps a non-floor trader avoid noise (trade activity which doesn't matter), and also juxtapose only those few price discovery movements which really matter. The present invention implements a unique combination of both layout and polar coordinate axis movements juxtaposed in such a manner as to help the trader's eye react more quickly to floor-driven market movements. Expert practitioners of trading would appreciate its unique features, and less experienced traders would greatly appreciate the ease of use and speed of conveyance of significant trades.

BRIEF DESCRIPTION OF THE DRAWINGS

FIG. 4C shows contract specs from the CME Group web pages for 10 yr. note futures and 10 yr. note options.

DETAILED DESCRIPTION OF VARIOUS PREFERRED EMBODIMENTS

Before explaining the various embodiments of the present invention it is to be understood that the invention is not limited in its application to the financial contracts set forth here. The invention is capable of other embodiments and of being practiced and carried out other ways. Initially and for our discussion we will be focusing on futures prices and their relationship to similar and derivative contracts such as options. We have primarily focused on the 10 yr. futures contract based on the current deliverable U.S. Government Treasury Note, as it is the one of the most active contracts at the CME group.

1. Basic Mode Alert Dials

The present invention allows participants to see clearly the relationship between derivative prices and the impact on volatility. Similar to floor traders standing and trading in adjacent futures and option pits, the dials show what happens when the price dynamics change.

Figure 1:
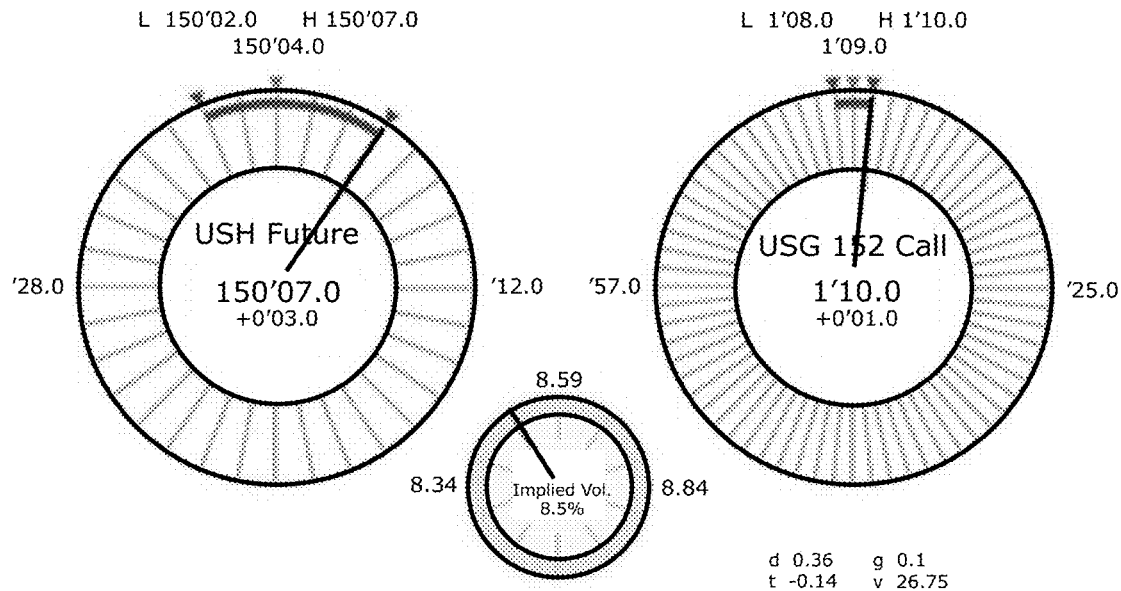
FIG. 1 is one embodiment of a most basic, simple version of the present invention, showing our proprietary alert display sent and rendered to any networked computer or mobile network device terminal FIG. 2A underlying futures contract unchanged, call option price increased, volatility increased.

The first preferred embodiment of the present invention shown in FIG. 1 has at least three circular or oval indicators rendered in polar coordinates, these three placed in unique juxtaposition with one another, each with one or more radar-like pointer-arms, which together comprise:

a) an Underlying security indicator (in this case, a US Bond Future with "H" designating the exercise month on the upper left, b) a Call option exercisable against that same bond Future on the upper right, c) an implied volatility indicator in the lower middle, as derived from standard American (or European) Black-Scholes math models.

The actual placement of these indicators can vary, but their shapes and placement should be close enough in proximity to one another to create a meaningful juxtaposition, which mimics the kind of filtered information which a human floor trader could selectively collect from observing open outcries in adjacent floor pits.

Hence, the basic embodiment shown in FIG. 1 mimics the open outcry dynamics floor traders participate in each day.

FIGS. 2A-2D shows four case examples of how these dynamics work the first two involve scenarios with call options and the second two involve scenario with put options. Note that call options have positive delta's and put options have negative delta's.

These 3-dial embodiments are also useful when looking at multi legged option structures. Meaning the same relationship will hold as demonstrated with a single option or with multi-legged structures—given that positive delta structures will behave as the call option does and negative delta structures will behave as the put option does.

Figure 2A:
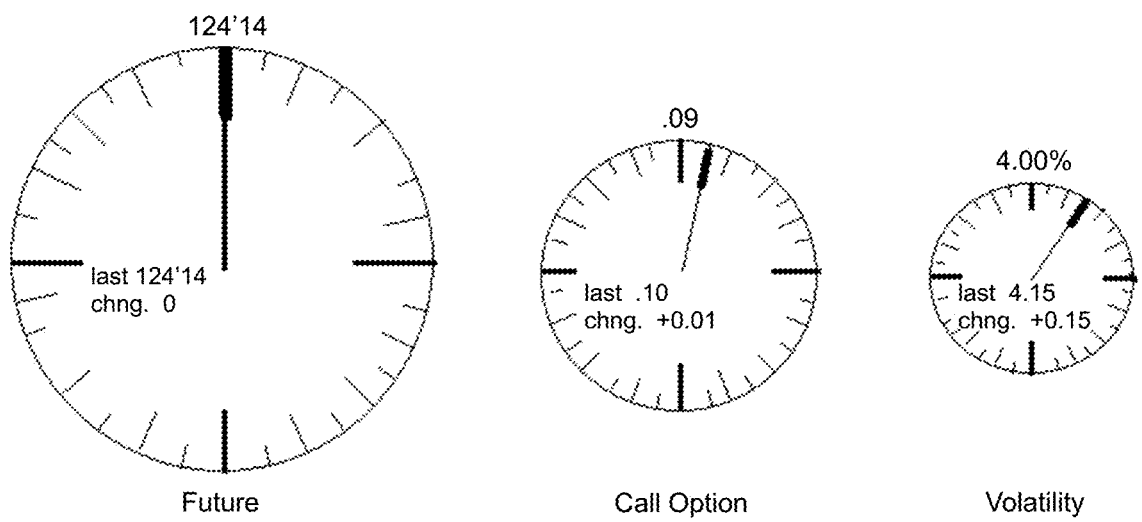
FIG. 2B futures contract decreased, call option unchanged, volatility decreased.
FIG. 2C futures contract unchanged, put option increased, volatility increased.
FIG. 2D futures contract decreased, put option unchanged, volatility increased.

FIG. 2A: the price of the option has increased relative the underlying futures contract. This often occurs when demand for a particular strike exceeds the amount "immediately" available for supply. This will have a spillover effect unless additional supply is readily available. That spillover effect will be to raise the price of all related options to reflect the new level of volatility. Typically, floor traders are the first to react as they witness the level the option trades at, aware that futures have not moved up.

The present invention allows "off floor" traders to react faster to the new level of volatility by displaying this information clearly and accurately.

Figure 2B:
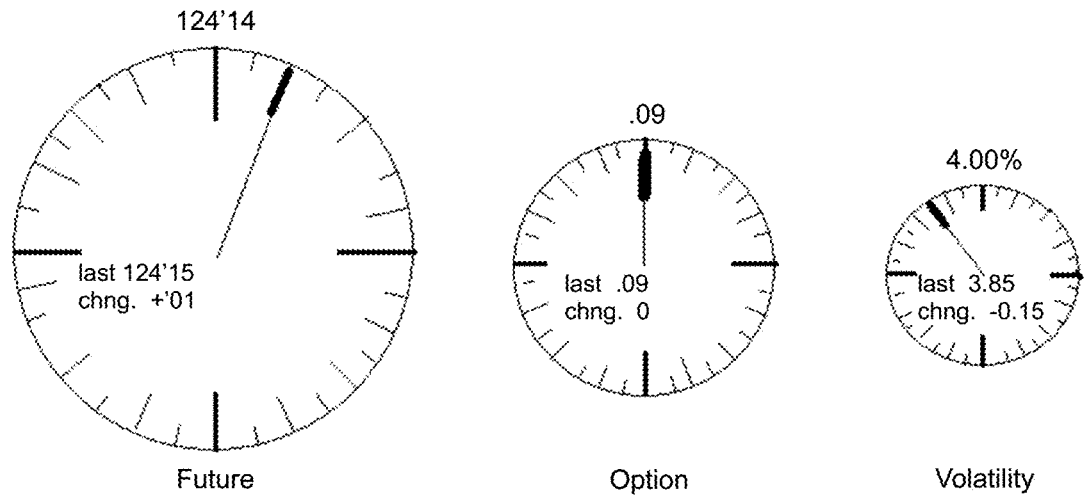

FIG. 2B: the price of the option stays unchanged relative the underlying futures contract rising. Often if the level of "excitement" is diminishing, volatility will decline as demand for calls or puts does not "keep pace" with the underlying futures.

Figure 2C:
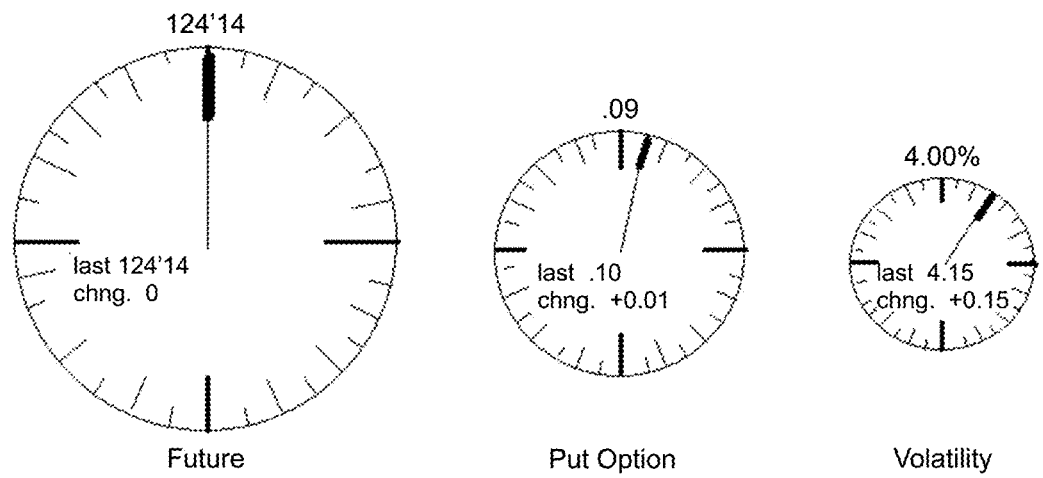

FIG. 2C: Just as with the call an aggressive buyer of a particular put will raise volatility by paying a higher price for the option even though the futures price has not moved.

Figure 2D:
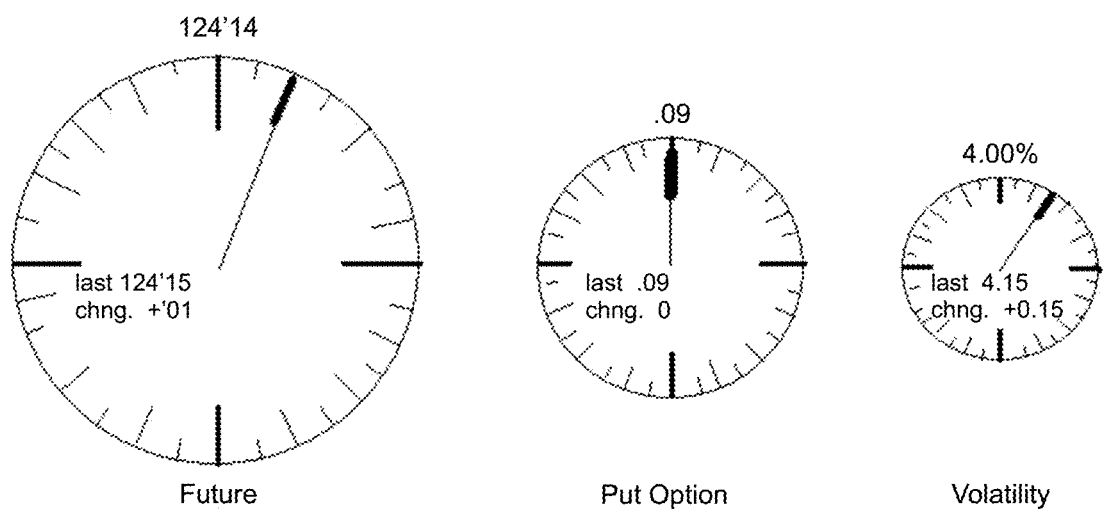

FIG. 2D: Since puts have a negative correlation with the underlying future—in this case even though the future has moved slightly higher the put option has not lost any value. Again these dials reflect actual trades and we capture the absolute levels that the underlying security is traded at to provide the hedge for the option market maker. The dials show instantly where the component prices are on the trade and the resulting level of volatility.

The dynamics portrayed in the present invention are intended to guide and teach traders how volatility is impacted by large trade flows. Combined with updates on volume and open interest which the exchange provides plus a rich database of previous trade alerts will enable traders to gain valuable insights: such as, "Is the aggressive buying interest in a particular option strike a new position or is it a 'short covering'?". By checking records and looking at exchange figures on open interest such determinations can be made with reasonable certainty.

2. Yield Alert VS. Targeting Modes

Figure 3A:
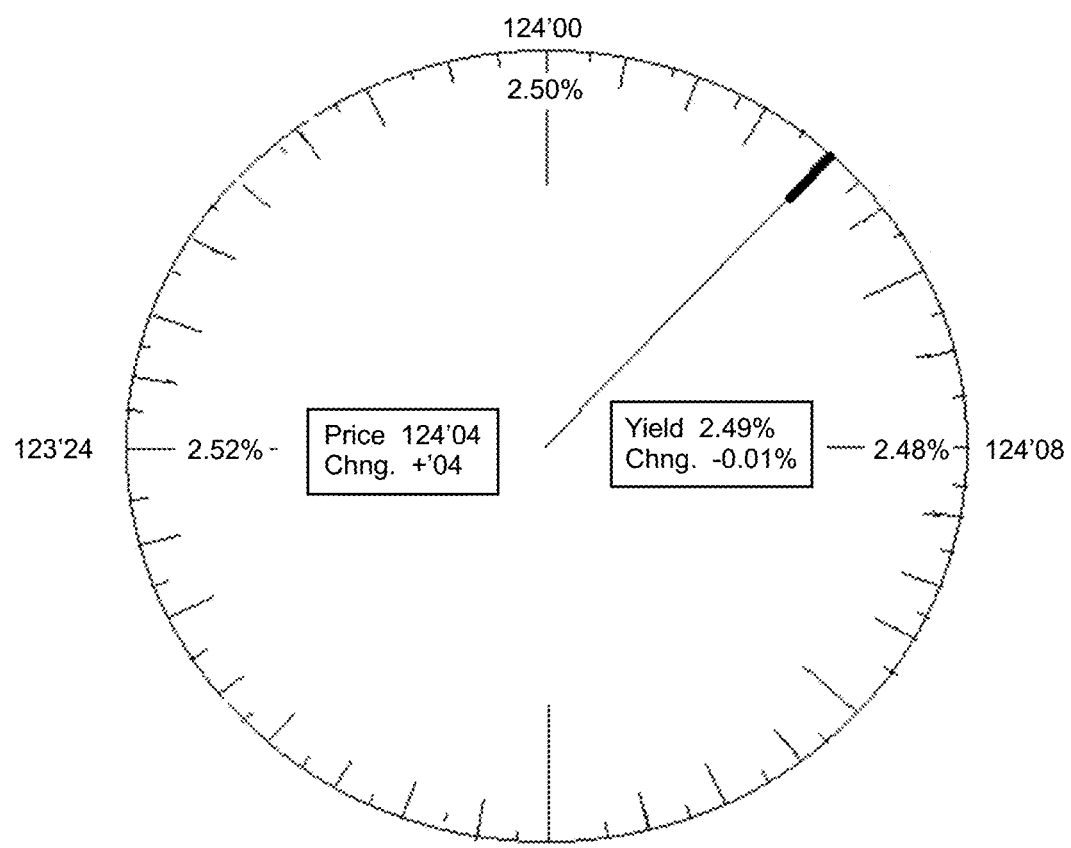
FIG. 3A-3B alert mode for cash yields associated with the price of the interest rate futures contracts traded at the CBOT.
Figure 3B:
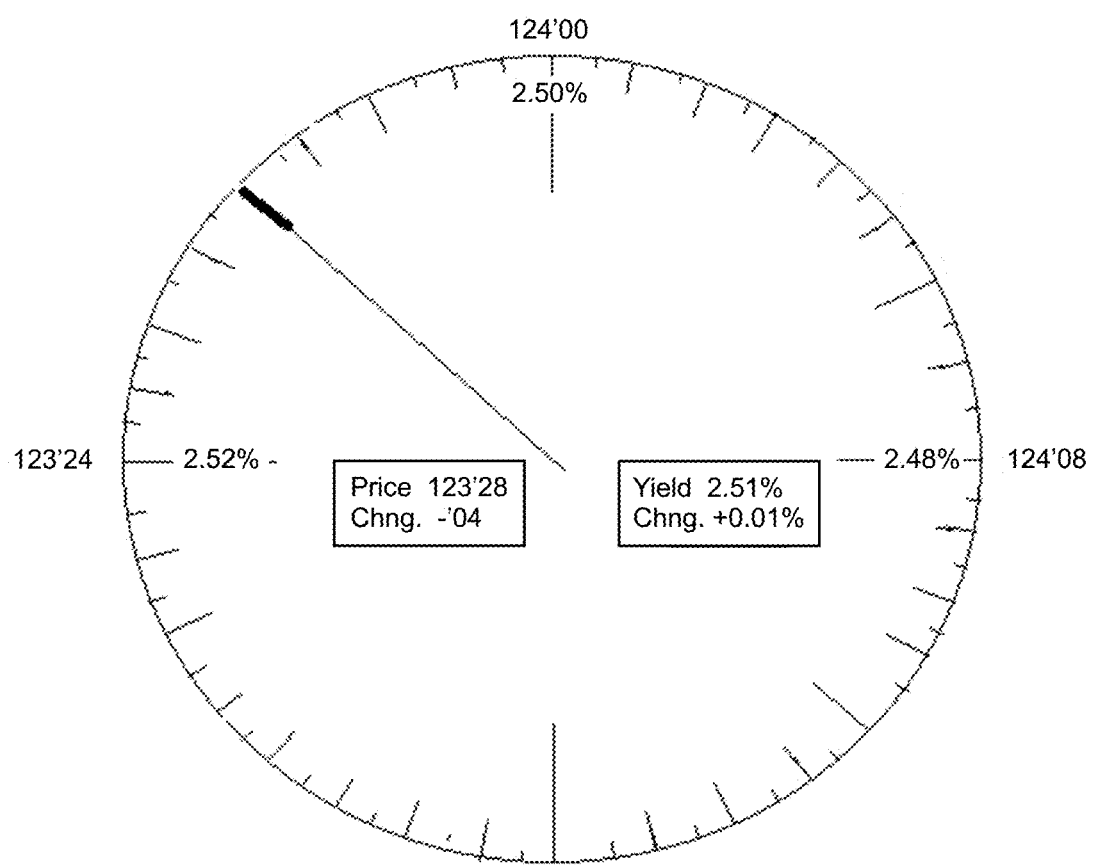

FIGS. 3A-3B shows an embodiment of the invention of yields alert mode, whereby the yield of the most recently issued "on the run" U.S. Government 10 yr. note is displayed.

Conversion factors provided by the exchange will determine the invoice price when someone delivers an actual cash note or bond into a futures position. These conversion factors can also be used to determine yields implied by any security. The key components that derive the conversion factor is the coupon and the time left till maturity of the cash instrument. The contract specifications in FIG. 4C defines which securities are eligible for delivery.

For example the CBOT 10 yr. note futures contract has a theoretical 6% coupon. However with 10 yr. yields currently around 2.5% there needs to be a means to determine prices that will reflect yield levels in the cash market. Thus there are specific conversion factors for any level of yields above or below the exchanges theoretical 6% level.

In order to save traders time and not have to look up proper conversion factors and do the math necessary to correlate the current futures price with the on the run notes yield our system displays the information where most systems only show one or the other but not together as ours does. Since there are several securities available other than the "on the run" user can select various securities and our system will select the correct conversion factor so that the yield associated with any deliverable cash security can be displayed. Since the U.S. 10 yr. yield is the most quoted rate universally (such as the level of the Dow or S&P 500 indices our system will always default to the "on the run 10 yr" unless a user selects a different cash instrument to track.

Figure 3C:
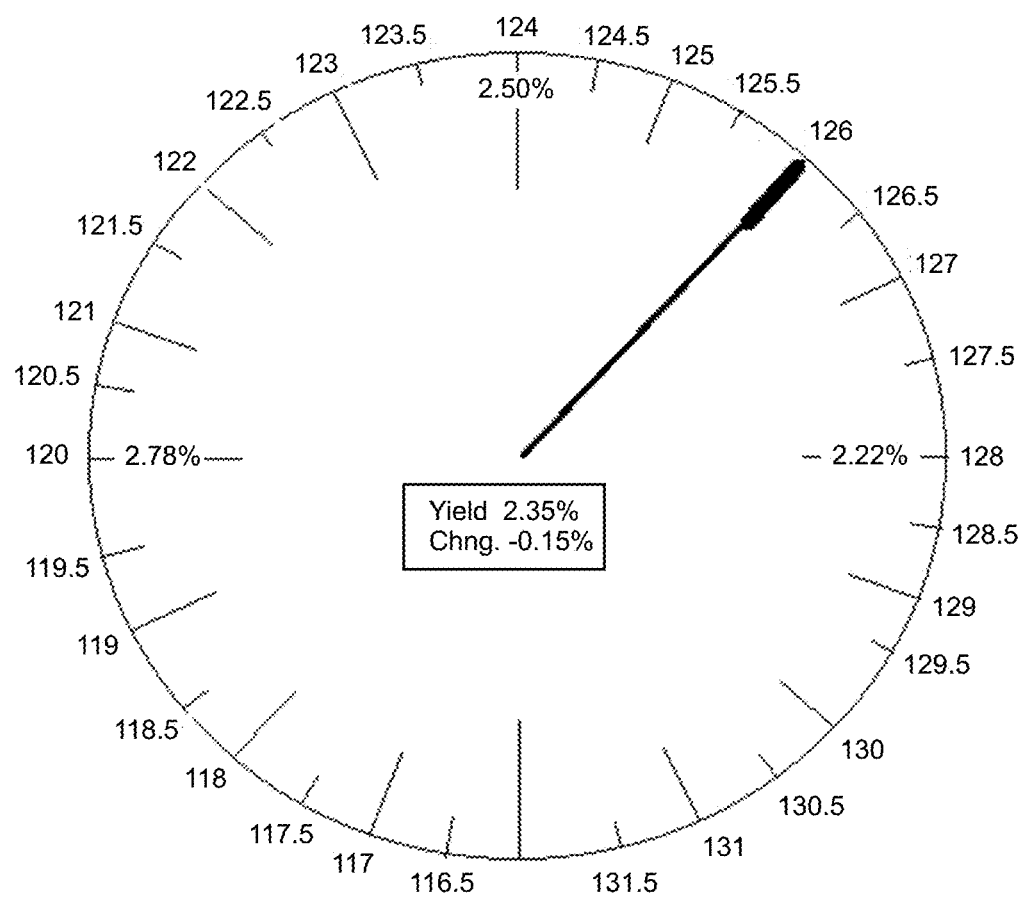
FIG. 3C-3D targeting mode for cash yields associated with option strike prices around rims.
Figure 3D:
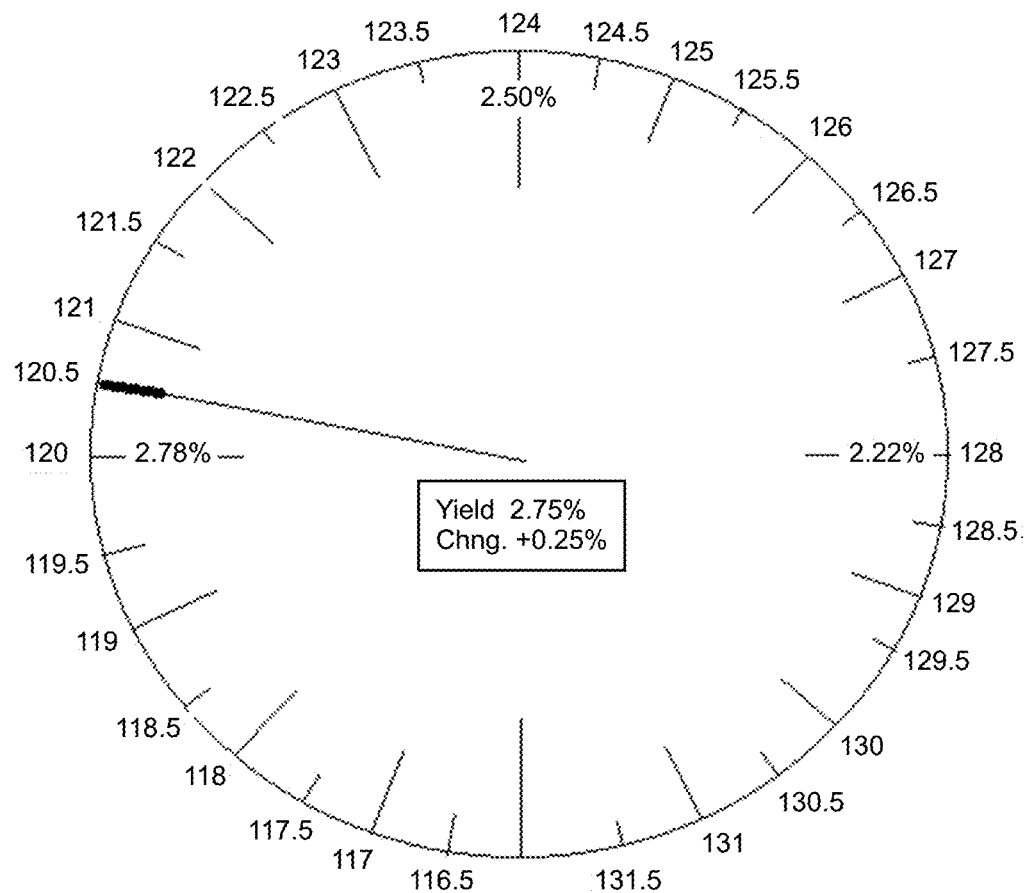

FIGS. 3C-3D shows an embodiment of a yields targeting mode which allows users to target some cash yields that are associated with the strike price of the interest rate option contracts. The user can select any strike and see if it matches his yield forecast. The dial is calibrated such that the 12:00 (Top dead center value) is the "at the money" strike. This strike is the one closest to where the underlying futures contract settled the previous day. Moving clockwise the strike prices show call options—moving counter clockwise put options are rendered.

The strikes are determined by the exchange. In this example strikes are available for points and half point targets. FIG. 4C is a copy of the exchange contract specifications for example, the US 10 yr. futures and options are shown.

As noted in claim (2) one embodiment of the invention is to allow users to target yields by strike prices. As noted for alert purposes and "in general" the system will default to calculating yields for the "bellwether" note or bond (most recently issued).

However the present invention provides users access to all conversion factors so that if they wish to use futures contracts to hedge a portfolio of notes or bonds other than the most recent issue those yields can be obtained and displayed on our dials in the same fashion as the "bellweather" yields are.

Figure 6A:
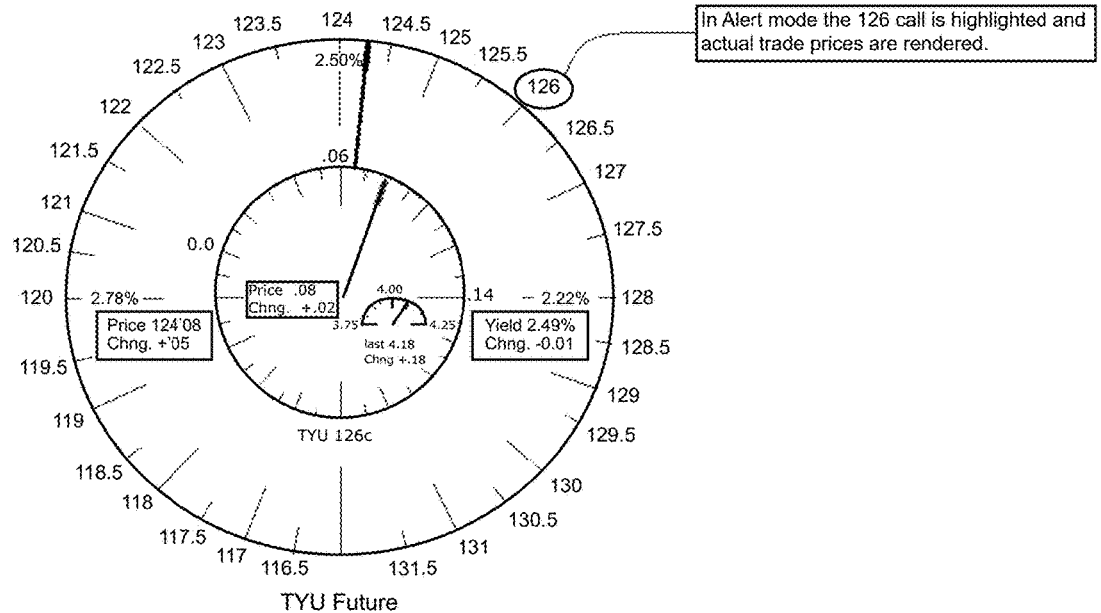
FIG. 6A is a concentric display mode analogous to the (fixed) alert on FIG. 1. A trader might receive this via an email, tweet or other automated alert delivery system.

In alert mode the embodiment in FIG. 6A shows and teaches which general yield level is being targeted by actual trades.

The yield associated with all the various strike prices, on puts and calls, is shown in use cases 7 and 8—as well as the yield being targeted by various option strategies case.

3. Smart Calibration Embodiment

Figure 4A:
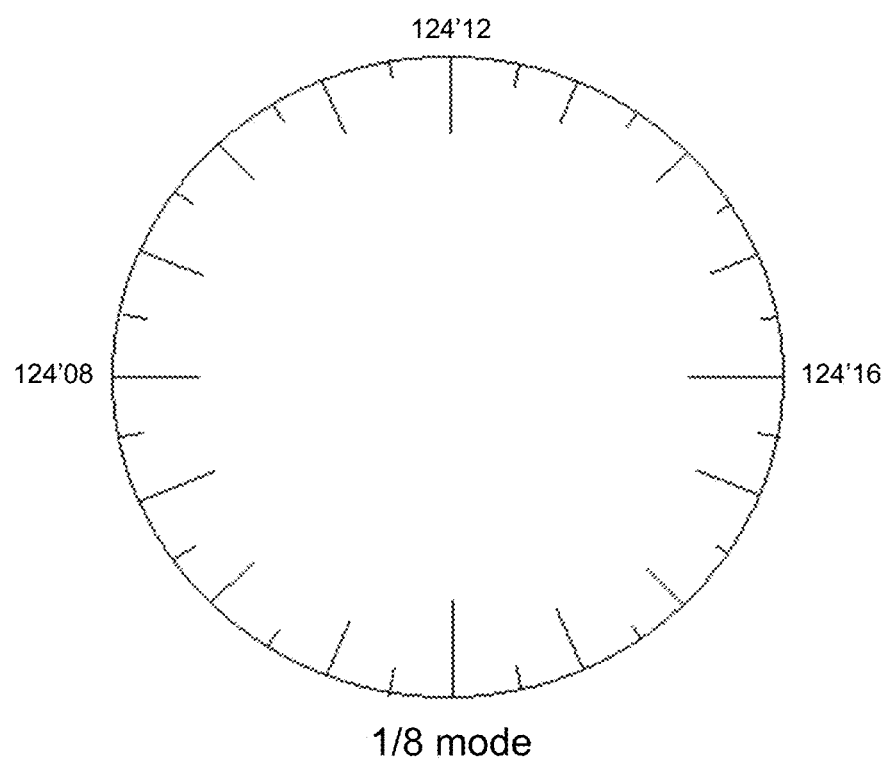
FIG. 4A-4B. shows some smart calibrations of selectable modes into polar coordinate for choosing fractions of a tick around the rims, to accommodate increasing price range and still keep same 12:00 value.
Figure 4B:
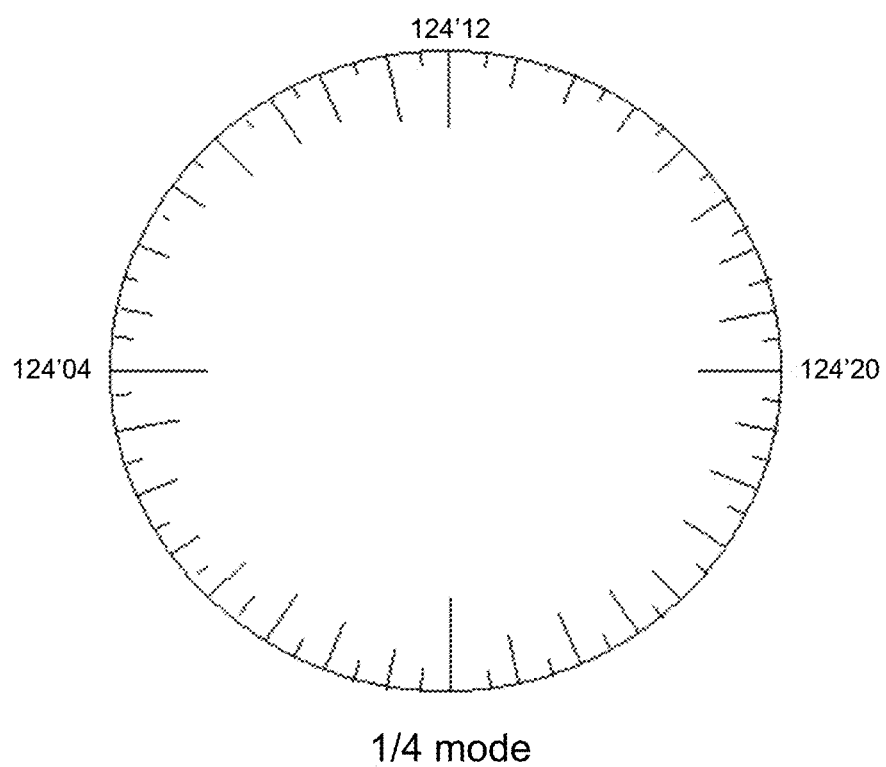

FIGS. 4A-4B shows a method of intelligent calibration of key polar coordinates implemented in the present invention—well beyond what a compass or watch, or any other static gauge can teach The various scaling modes embodied in the present invention implement and show the number of 32nds covered between a move from 12:00 position to the 3:00 position. The present invention can also show other intervals such as 64ths. Or any type of price increment, whether arcane fractions or more practical decimals.

The present invention will render dials pre-calibrated without requiring a user to look up the exchange's contract specs, such that meaningful price ranges are depicted and updated as need be.

A sample contract specification for the US 10 yr. note futures is provided by the CME exchange FIG. 4C. 10 yr. note futures are quoted in points and one of $\frac{1}{32}^{nd}$ of a point.

FIG. 4A is calibrated in ⅛ mode and FIG. 4B is recalibrated into ¼ mode. (Not shown: the present invention can continue to scale to ½ mode and full point mode.)

How the recalibration is triggered is part of claim (3) and is proprietary to the present invention. The present invention will recalibrate the dial when the price takes the dial one increment plus or minus 180 degrees. That way price movement will always be depicting positive prices on the right half of the dial and negative prices on the left half of the dial. Shading as discussed in the initial claim will be recalibrated as well to show the price range for each session.

If market exceeds range as explained in claim (3) key polar coordinates will be recalibrated to accommodate expanded range.

4. Complex Yield Curve Spread Targeting Modes

Yield curve trades are Future spreads which involve buying one contract targeting yields of one duration, such as 5 years, and selling one contract targeting yields of another duration, such as 10 years. The differential price is simply the mathematical difference in the 2 contract prices shown. One embodiment of the present invention shown in FIG. 5 places the 12 o'clock value as the previous day's settlement price. The pointer stylus points to where each component price was traded. The differential stylus price is the difference between prices at the time of the trade. Yield differentials are calculated and expressed in the body of each dial.

Figure 5:
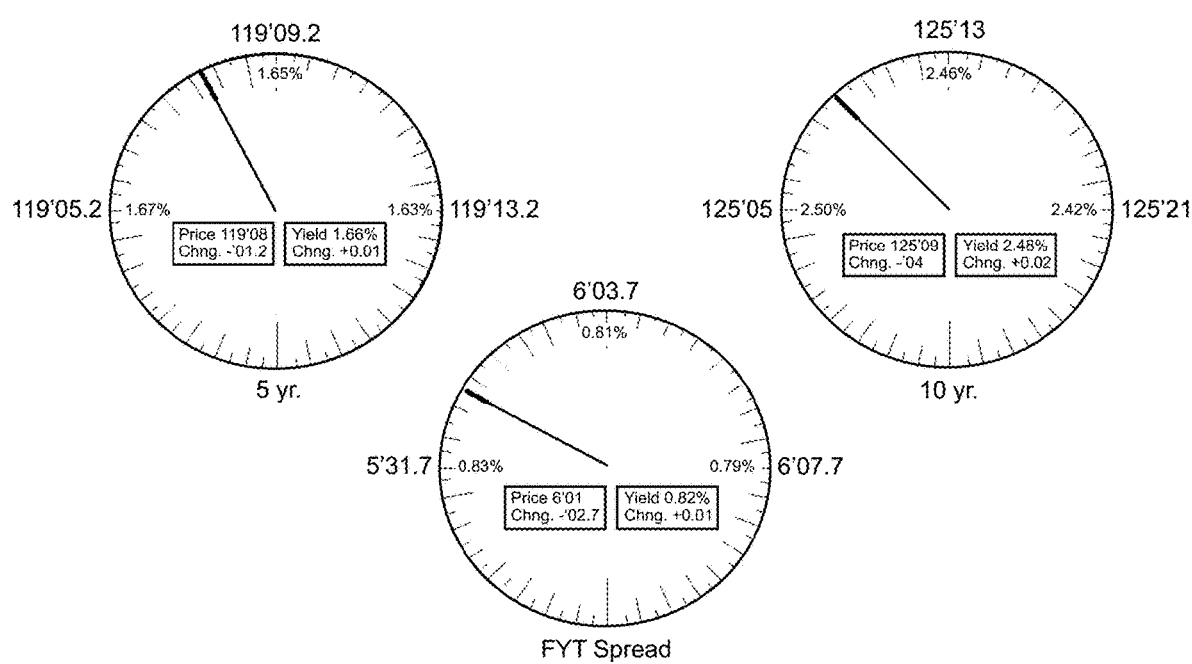
FIG. 5 shows one embodiment of a spread relationship between a 5 yr. maturity and a 10 yr. maturity with a combined yield indicator of the spread. This is one example of application of the present invention to a yield curve trade.

FIG. 5 Yield curve trades are used to speculate and manage risk on changes in interest policy and the behavior of rates over time. The present invention makes understanding of these changes faster to understand and assimilate and more intuitive by showing price and change of the components and then expressing the differential (by rendering a dial that is calibrated to show the differentials as key polar coordinates). The yields associated with the prices are also valuable to mimic how cash market traders initially select targets.

In FIG. 5 the juxtaposition of the dials renders a yield curve trade, where the 5 yr. note (upper left dial) was bought at a price of 119'08 vs selling a 10 yr. note at a price of 125'09. (upper left dial). The dial in the lower center portion shows the mathematical difference where each contract settled the previous trading session and the stylus points to the current differential price. The yield differential is also provided.

Note so the dial does not get to cluttered key polar coordinates (12:00 3:00 and 9:00 positions) display price and yield—current value (where stylus is pointing is portrayed in the body of the dial keeping things neat and uncluttered.

5. Concentric Display Mode

Another embodiment of the invention involves employing concentric circles in order to maximize available screen space and even intensify situational awareness at the same time. In terms of showing how single options or option structures can be rendered using our method the illustrations below demonstrate.

FIG. 6A is a concentric display mode analogous to the (fixed) alert on FIG. 1. A trader might receive this via an email, tweet or other automated alert delivery system.

Figure 6B:
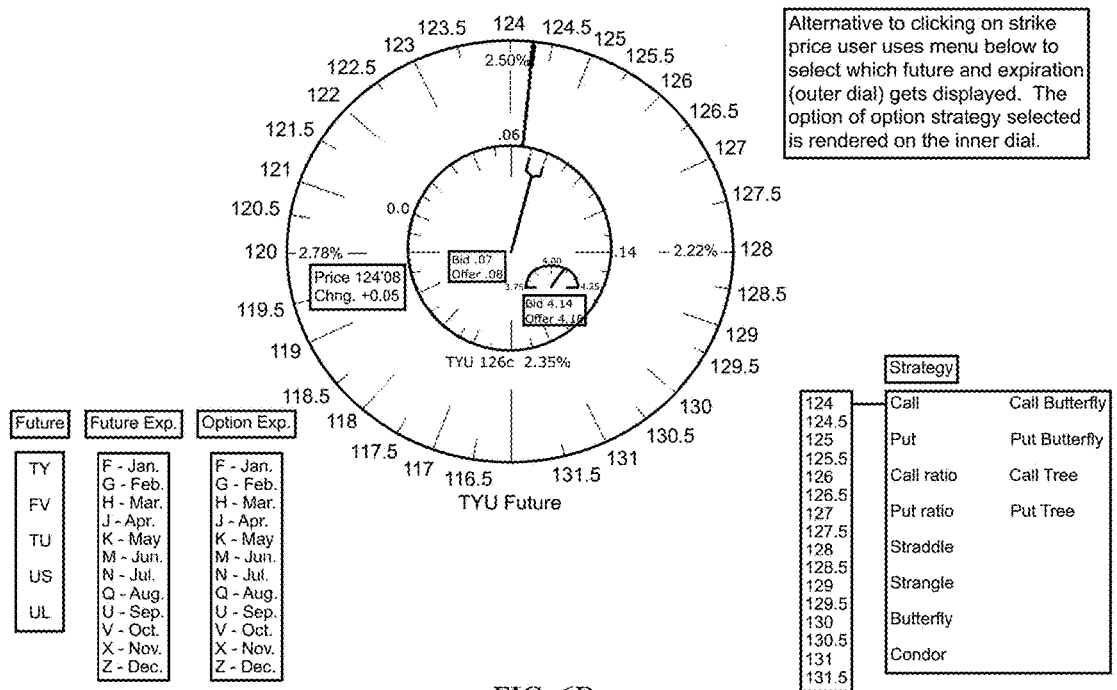
FIG. 6B is a special mode for a trader to target potential trades (not executed yet) by seeing what yields might apply when a trader manually picks a strike price and strategy desired.

FIG. 6B is a special targeting mode for a trader to target potential trades (not executed yet) by seeing what yields might apply when a trader manually picks a strike price and strategy desired.

In targeting mode FIG. 6B the user can select the yield and quickly discover which strike price matches that yield. In target mode and as noted in claim 2 our dials are now calibrated so the at-the-money strike is located at the 12:00 position. Moving clockwise the strike prices increase and are call options. Moving counter clockwise the strike prices decrease and are put options.

6. Interactive Multi-Concentric Display Mode

Figure 7:
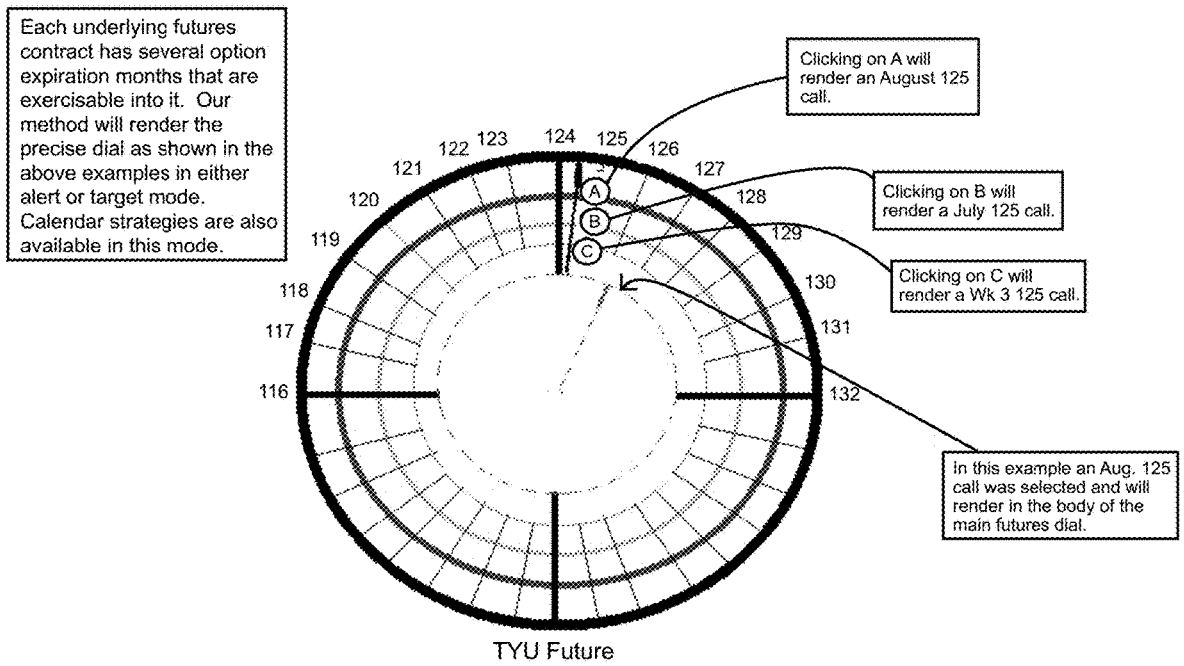
FIG. 7 multiple concentric circles to depict and analyze options with different expiration months.

In the mode embodiment shown in FIG. 7, all the various option expirations are rendered as concentric circles. The outer perimeter would be the underlying futures contract. Moving inward the next circle would be those options with the longest amount of time till expiration and the next circle those with the second longest time till expiration and so on. This method easily renders all option expirations exercisable into the same future contract. By selecting one the current price can be seen and quicker decisions can be made.

7. x-y Chart Analysis Mode

Figure 8A:
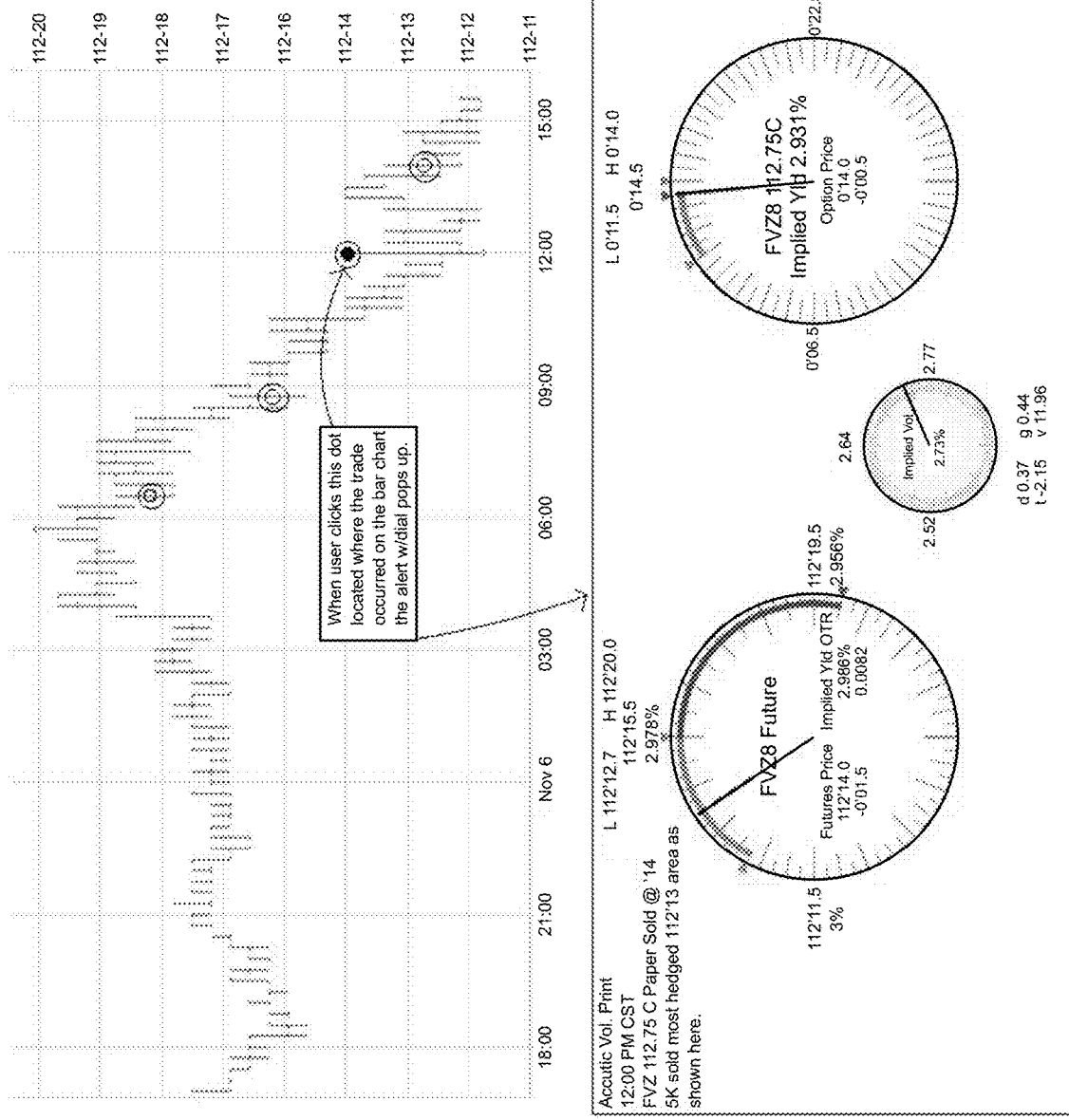
FIG. 8A. shows an early embodiment of the present invention in Overlay mode, whereby a user can click on a $3^{rd}$ party price history chart, to retrieve relevant alerts by date and security type.

FIG. 8A. shows an basic embodiment of the present invention in x-y chart overlay mode, whereby a user can click on a $3^{rd}$ party price history chart, on hot spots (marked here in yellow dots) to retrieve a pop up of relevant alerts, such as the alert formats shown in FIG. 1 or alternate modes such as FIGS. 6A-6B, by date and security type. Not shown are alternate embodiments of this popup which are semi-transparent, akin to a fighter cockpit HUD (Heads-Up-Display), which can be drag-and-dropped to a convenient place on the display terminal or a web-page, or can utilize novel algorithms embodied in this Invention to automatically place this overlay in a place that does not interfere with seeing the underlying chart, using some graphic. This pop-up is placed within an intuitive frame that allows the user to mouse over additional buttons or to hand point directly on touch-screen (for Windows 8 and iPad/Android/iPhone smart phone and smart pad and smart PC users), said buttons which can control mode, sizing, drag-and-drop location, and pinch-to-minimize or maximize controls.

Figure 8B:
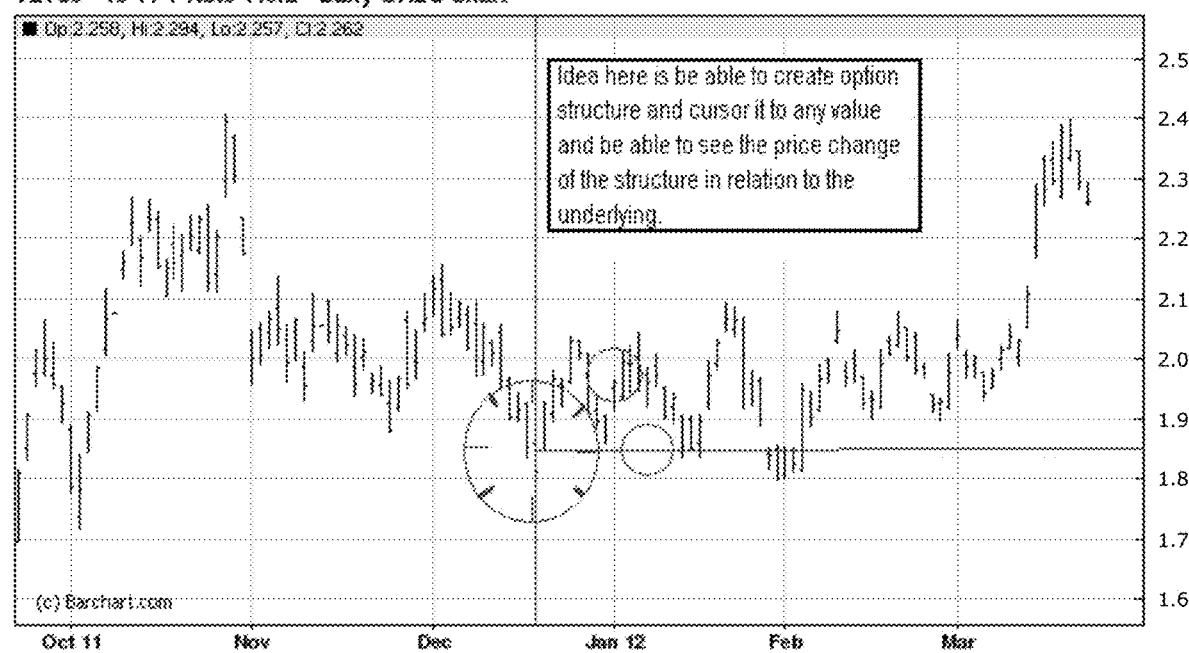
FIG. 8B. shows the present invention in a special targeting mode, operating directly on a historic x-y chart.

FIG. 8B shows a different embodiment of an x-y chart analysis mode, more akin to targeting hypothetical trade spreads, whereby the user can cursor directly over a traditional $3^{rd}$ party historic trading chart, to see an instant rendering of what the hypothetical trading strategy would look like. Here the user will have pre-selected an option strategy structure such as one of the types shown in FIG. 6B, to format the appearance of the cursor's pipper into one of the aforementioned dial modes. Moving the cursor to the right will change the day being hovered over, and will cause a real-time re-calculation of the time decay component (distance to expiry date) associated with option values, to render into this dial pipper. Moving the cursor up or down will change the targeted price of the underlying instrument, and will also cause a real-time re-calculation, to render into this dial pipper its impact on the option or option structure.

For example a put or an option structure with a negative delta will see the stylus move counter clockwise as the cursor is moved higher. With a call or a positive delta structure the cursor will move clockwise as the cursor is moved the right. Note this is assuming there is little if any change in volatility. Also moving the cursor horizontally to the right with no vertical movement will cause the value of any option or option structure to decline regardless of whether it has a positive or negative delta. This mode is highly useful for quicker uptake and analysis, which is not present in prior art.

The present invention implements far more flexible overlays than seen anywhere in the prior art, such as volatility alerts laid out akin to fighter cockpit radar and HUD (Heads Up Displays) screens, FIG. 8A, which glow in color, and which can automatically adjust itself to various changes in environment in real time via smart calibration. The displays in the Invention can be overlaid or drag-and-dropped over other $3^{rd}$ party financial stock ticker or price-quote charts such as candlesticks, or displayed in its own standalone corner, which can be drag-and-dropped by the user.

Like a fighter aircraft radar or AWACS aircraft crew station, the visual overlays will display certain minimal data out-of-the-way during the trading day FIG. 8A, but can also flash directly on-screen whenever threats or alerts occur. One of the visual design features of this overlay comprise two or more displays with a pointer-arm tracking polar coordinates indicating time-sensitive price information of underlying security and its related derivative (such as a future or an option, or more than one leg of a spread), plus prior day's settlement price coupled to present-day's high/low trading price ranges, all intuitively placed within the same polar coordinate display indicator, and a third polar coordinate display showing volatility, plus optional displays showing other Greeks such as deltas (change in option price per tick change in underlying security), arranged so that the trader can see in one instant glace what is going on. Another feature of these overlays is that the trader can click on various dates and icons directly on their charting displays, to bring up relevant alert overlays using the present invention.

The present invention gives instant intuition at one glace, by implementing moving gauges that automatically calibrate itself to changing conditions, and which are laid out in a fashion which maximizes detection and reaction by the peripheral vision of the human eye. The particular visual layout and movement along polar coordinates implemented in this Invention has been shown to improve situational awareness and reaction times over the present state of the art alert systems.

8. Profit-Loss Polar Indicator Mode

Figure 9A:
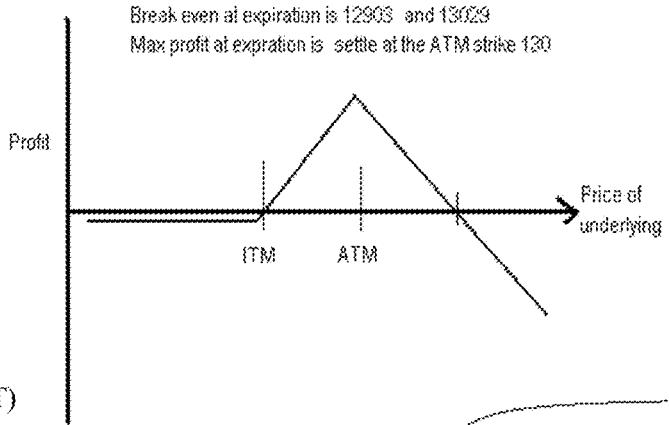
FIG. 9A-9B shows how a traditional profit-loss x-y chart can be translated into a simpler polar-coordinate circular display of the present invention which is easier and faster to analyze.

FIG. 9A. shows a traditional prior art method of displaying profit/loss curves for a 1:2 Option Call Ratio Spread. Ordinarily, it takes a significant amount of expensive training and time spent thinking, to be able to analyze such a chart, and it does not support instant decisions very well for most people.

Figure 9B:
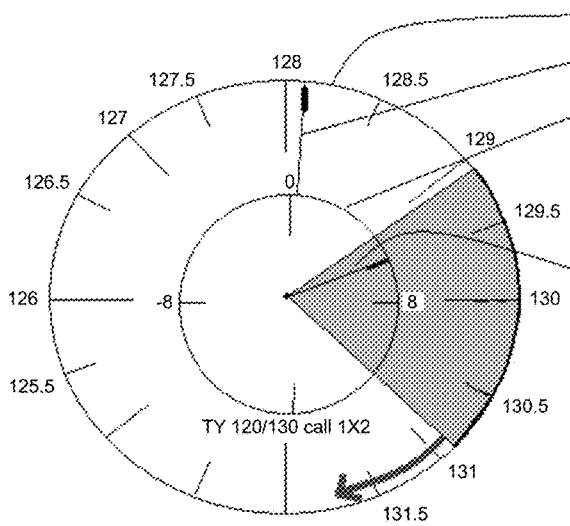
Figure 10:
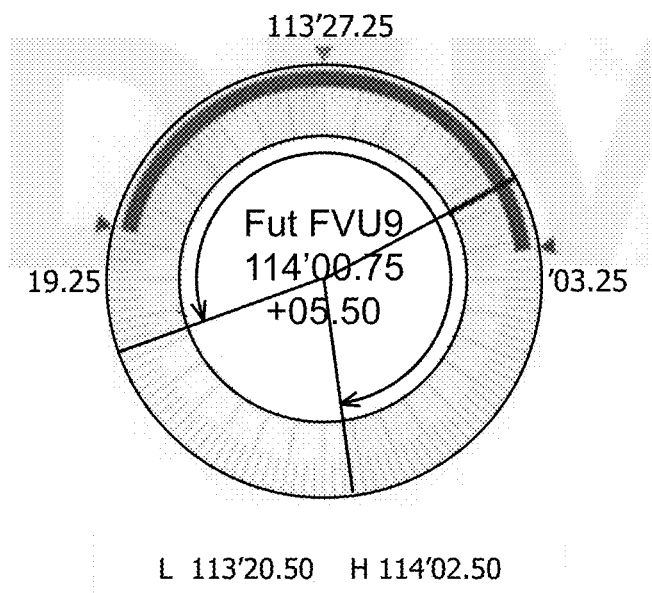
FIG. 10 shows an embodiment of the invention where the implied volatility value (calculated elsewhere) suggests a probable future trading range based on range from where stylus (current price) is pointing.

FIG. 9B on bottom shows how one embodiment of the present invention converts the math models behind the 1:2 Call Ratio Spread in FIG. 9A from a traditional profit/loss curve, into a radar-like polar circular display FIG. 9B, whereby the user can more intuitively tell what region a spread is profiting (green shading) or losing (red shading) at the chosen moment, in a much quicker glance. An alternate embodiment (not shown) can render a gradient shading, whereby a more intense green corresponds to maximum targeted profit areas, which fades away to a lighter shade of green as the profit curve declines down to zero, and then transitions to a light shading where there is minor loss regions, going up towards a more intense red the closer one gets to 180 degree regions where losses are much higher (potentially unlimited in the case of a 1:2 call ratio spread).

The inner polar indicator is rendered as per the Concentric display mode in FIG. 6B, which represents just one of many targetable options or option structures, and renders as a composite indicator of the structure concentrically inside the outer indicator of the main Future. If the pointer for the outer rim (Futures FIG. 9B) moves to 130, that will be the maximum profit point for the Call Ratio Spread, corresponding to the at-the-money (ATM) peak point in the traditional graph FIG. 9A.

In the risk profile gauge FIG. 9B, the Green shading is profit regions. The red is the border where loss starts to accrue. Additional gradient shading can also be added to show max profit at 130 (not shown in FIG. 9B).

Risk-profile ranges are algorithmically converted within the present invention, into the said gauge display in polar coordinates, in such a fashion that slight deviations in complex derivatives become instantly discerned, and more understandable, even to amateur traders, and much faster for professional traders.

DETAILED REVIEW OF PREFERRED EMBODIMENTS

This paragraph pulls together the various modes discussed above, into a cohesive whole, to demonstrate how the different preferred embodiments might work together. For instance, the manner in which the present invention improves risk-profile analysis, FIGS. 9A-9B, is by adding a movable overlay gauge FIG. 8B, also using smart calibration FIGS. 4A-4B, which is capable of being configured for a wide range of complex derivatives FIG. 5, such as bull call spreads or condors, ration spreads, calendar spreads and so on, with all legs being coalesced into a single polar coordinate gauge. The gauge is overlayed over a traditional price bar chart for a particular spread type, and can be dragged around by a user to view the effects of taking various positions along various points of the risk-profile curves, FIGS. 9A-9B.

There are also a number of embodiments expressed in the present invention's software architecture and code themselves, such as the following:

(Not shown here) is a set of data-entry web forms and interactive terminals to set the modes of each dial (governing what resolution of ticks there are around the rims, to match with Traditional price formats), as a front-end to various price-formatting algorithms operating under the hood, which convert back and forth between arcane traditional price quote formats (such as 150'02"0) and decimal for storing in an online database, and also cached in the web (or mobile) browser itself.

The invention also comprises innovative user-interfaces for data entry, FIGS. NOT SHOWN. Another variant of the Invention automates most data entry, by linking into $3^{rd}$ party data provider networks to retrieve, process and re-package market data into the displays implemented in this Invention.

The invention also comprises a networked, redundant, fault tolerant database system on the Internet cloud, coupled with some leading-edge client-side code (browser and mobile phone) that can pull data from multiple redundant sources, to help ensure faster response and more robust fault-tolerance even if some major ISPs or power plants shut down. By leveraging systems such as Google App Engine, or Amazon Web Services and Heroku database hosting, the present Invention utilizes state-of-the-art subsystems to remain fast and responsive 24×7, globally.

I claim:

1. A computer-implemented method for displaying option trades, the method comprising the steps of:
   a. selecting, by a user, a security;
   b. linking, by a computer, to a third-party data provider, to retrieve, process, and repackage market data;
   c. rendering, on a display by the computer, a price range and a history of the selected security on a X-Y chart;
   d. filtering, by the computer, data based on the selected security to identify option trades related to the security;
   e. populating, by the computer, the X-Y chart with clickable alert icons pertaining to the identified option trades;
   f. selecting, by the user, one of the clickable alert icons;
   g. generating, by the computer, at least a first dial, a second dial, and a third dial in response to the user selecting the one of the clickable alert icons, wherein the first dial, the second dial, and the third dial are positioned adjacent to the rendered X-Y chart;
   h. calibrating, by the computer, the first dial using an initial scale, wherein top dead center of the first dial represents a previous day's settlement price of the security, and wherein evenly spaced marks along a circumference of the first dial represent a price change of the security, relative to the previous day's settlement price of the security, wherein the computer tracks a real-time price of the security, based on the market data, calculates a resultant real-time change in price of the security, relative to the previous day's settlement price of the security, and indicates the real-time change in price of the security using a stylus within the first dial;

i. calibrating, by the computer, the second dial using an initial scale, wherein top dead center of the second dial represents a previous day's settlement price of an option that corresponds to the one of the alert icons selected by the user, and wherein evenly spaced marks along a circumference of the second dial represent a price change of the option, relative to the previous day's settlement price of the option, wherein the computer tracks a real-time price of the option, based on the market data, calculates a resultant real-time change in price of the option, relative to the previous day's settlement price of the option, and indicates the real-time change in price of the option using a stylus within the second dial;

j. calibrating, by the computer, the third dial using an initial scale, wherein top dead center of the third dial represents a previous day's volatility, based on the previous day's settlement price of the security and the previous day's settlement price of the option, and wherein evenly spaced marks along a circumference of the third dial represent a change in volatility, relative to the previous day's volatility, wherein the computer tracks a real-time volatility, based on the real-time price of the security and the real-time price of the option, calculates a resultant real-time change in volatility, relative to the previous day's volatility, and indicates the real-time change in volatility using a stylus within the third dial; and k. recalibrating, by the computer, one or more of the first dial, the second dial, and the third dial when the real-time change in price of the security, the real-time change in price of the option, or the real-time change in volatility, respectively, reaches one increment plus or minus 180 degrees from top dead center of the first dial, the second dial, or the third dial, respectively, wherein positive changes in the price of the security, the price of the option, and the volatility are displayed exclusively on a right hemisphere of the first dial, the second dial, and the third dial, respectively, and negative changes in the price of the security, the price of the option, and the volatility are displayed exclusively on a left hemisphere of the first dial, the second dial, and the third dial, respectively.

2. The method of claim 1, wherein the step of recalibrating comprises doubling a number of marks on the first, second and third dials, wherein the price change of the security, the price change of the option, and the change in volatility represented by each mark-to-mark increment following recalibration is equal to the price change of the security, the price change of the option, and the change in volatility represented by each mark-to-mark increment prior to recalibration, wherein, post-recalibration, top dead center of the first dial continues to represent the previous day's settlement price of the security, top dead center of the second dial continues to represent the previous day's settlement price of the option, and top dead center of the third dial continues to represent the volatility based on the previous day's settlement price of the security and the previous day's settlement price of the option.

3. The method of claim 1, further comprising the step of rendering a shaded area on the first dial, wherein the shaded area represents a probable trading range of the security based on the real-time change in volatility rendered in the third dial as a result of a trade alert.

4. The method of claim 1, further comprising the step of rendering a yield level of treasury securities associated with treasury futures and option prices targeted by a trade and yield level associated with related option strike prices targeted by a trade.

5. A computer-implemented method for situational awareness in derivatives trading, comprising the steps of:

a. selecting, by a user a security;

b. filtering, by a computer, data based on the selected security to identify related options;

c. linking, by the computer, to a third-party data provider, to retrieve, process, and repackage market data;

d. assembling, on a display by the computer, a dial comprising an outer circle, wherein the outer circle represents the security;

e. calibrating, by the computer, the outer circle with an at-the-money strike price at top dead center of the outer circle, wherein evenly spaced marks along a circumference of the outer circle and in a right hemisphere of the outer circle represent call strike options, and wherein evenly spaced marks along the circumference of the outer circle and in a left hemisphere of the outer circle represent put strike options, wherein the marks are clickable, wherein the computer tracks a real-time price of the security, and based on the market data, calculates a resultant real-time change in price of the security, relative to a previous day's settlement price of the security, and indicates the real-time change in price of the security using a first stylus within the outer circle, and renders, within a body of the dial, a numerical value indicated by the first stylus;

f. selecting, by the user, a first option by clicking on a first mark, wherein the first mark is selected from the marks along the circumference of the outer circle;

g. creating, on a display by the computer, an inner circle, positioned within the outer circle, in response to the user clicking on the first mark, wherein the inner circle represents the first option;

h. calibrating, by the computer, the inner circle with a previous day's settlement price of the first option at top dead center of the inner circle, wherein evenly spaced marks along a circumference of the inner circle indicate a change in price of the first option, relative to the previous day's settlement price of the first option, wherein the computer tracks a real-time price of the first option, and based on the market data, calculates a resultant real-time change in price of the first option, relative to the previous day's settlement price of the first option, and indicates the real-time change in price of the first option using a second stylus within the inner circle.

6. The method of claim 5, wherein the dial further comprises a series of concentric circles within the outer circle, wherein an innermost circle represents an option with a least amount of time until expiration, wherein each successive circle moving inward from the outer circle represents an option with a lesser amount of time until expiration, wherein all option expirations are exercisable into an underlying security, wherein each circle has a separate stylus to track price changes of a respective circle.

7. The method of claim 5, further comprising the step of calculating regions of loss and profit, wherein the regions of loss are shaded in red and the regions of profit are shaded in green.

8. The method of claim 5, further comprising the steps of:
selecting, by the user, at least a second option by clicking on at least a second mark, wherein the at least the second mark is selected from the marks along the circumference of the outer circle, wherein the inner circle further represents the at least the second option; and recalibrating, by the computer, the inner circle with a mathematical difference of a previous day's settlement price of the first option and the at least the second option at top dead center of the inner circle, wherein, upon recalibration, the evenly spaced marks along the circumference of the inner circle indicate a change in a mathematical difference of pricing between the first option and the at least the second option, relative to the mathematical difference of the previous day's settlement price of the first option and the at least the second option, wherein the computer tracks a real-time mathematical difference of pricing between the first option and the at least the second option, calculates a resultant real-time change in the mathematical difference of pricing between the first option and the at least the second option, relative to the mathematical difference of the previous day's settlement price of the first option and the at least the second option, and indicates the real-time change in the mathematical difference of pricing between the first option and the at least the second option using the second stylus.

9. The method of claim 5, further comprising the step of rendering a yield level of treasury securities associated with treasury futures and option prices and yield level associated with related option strike prices.

10. A computer-implemented method for situational awareness in derivatives trading, comprising the steps of:
a. selecting, by a user, a first security and a second security;
b. generating, on a screen by a computer, at least a first dial, a second dial, and a third dial in response to the user selecting the first security and the second security, wherein the first dial, the second dial, and the third dial are juxtaposed within a single screen;
c. linking, by the computer, to a third-party data provider to retrieve, process, and repackage market data, including a real-time price of the first security and a real-time price of the second security;
d. calibrating, by the computer, the first dial using an initial scale comprising a plurality of evenly spaced marks along a circumference of the first dial, wherein the marks indicate a price change of the first security, relative to a previous day's settlement price of the first security, wherein top dead center of the first dial represents the previous day's settlement price of the first security, wherein the computer tracks the real-time price of the first security, calculates a resultant real-time change in price of the first security, relative to the previous day's settlement price of the first security, and indicates the real-time change in price of the first security using a stylus within the first dial;
e. calibrating, by the computer, the second dial using an initial scale comprising a plurality of evenly spaced marks along a circumference of the second dial, wherein the marks indicate a price change of the second security, relative to a previous day's settlement price of the second security, wherein top dead center of the second dial represents the previous day's settlement price of the second security, wherein the computer tracks the real-time price of the second security, calculates a resultant real-time change in price of the second security, relative to the previous day's settlement price of the second security, and indicates the real-time change in price of the second security using a stylus within the second dial;
f. calibrating, by the computer, the third dial using an initial scale comprising a plurality of evenly spaced marks along a circumference of the third dial, wherein the marks indicate a mathematical difference between the price of the first security and the price of the second security, relative to a difference in a previous day's settlement price of the first security and the second security, wherein top dead center of the third dial represents the difference in the previous day's settlement price of the first security and the second security, wherein the computer tracks a real-time difference in the price of the first security and the second security, calculates a resultant real-time change in difference in the price of the first security and the second security, relative to the previous day's difference in the settlement price of the first security and the second security, and indicates the real-time change in the difference in price of the first security and the second security using a stylus within the third dial; and
g. recalibrating, by the computer, the marks between 0 and 180 degrees of one or more of the first dial, the second dial, and the third dial when the real-time change in price of the first security, the real-time change in price of the second security, or the real-time change in the difference in price of the first security and the price of the second security, respectively, reaches one increment plus or minus 180 degrees from top dead center, wherein the real-time change in price of the first security, the real-time change in price of the second security, and the real-time change in the difference in the price of the first security and the price of the second security are always displayed with positive changes on a right hemisphere of the first dial, the second dial, and the third dial, respectively, and negative changes on a left hemisphere of the first dial, the second dial, and the third dial, respectively.

* * * * *